United States Patent [19]

Hasan et al.

[11] Patent Number: 5,100,274
[45] Date of Patent: Mar. 31, 1992

[54] ROOFING FASTENER AND IMPROVED SCREW THEREFOR

[75] Inventors: Syed Riaz-Ul Hasan, Palatine; Michael P. Ditka, Deerfield, both of Ill.

[73] Assignee: Illinois Tool Works Inc., Glenview, Ill.

[21] Appl. No.: 739,308

[22] Filed: Aug. 1, 1991

Related U.S. Application Data

[63] Continuation-in-part of Ser. No. 604,459, Oct. 29, 1990.

[51] Int. Cl.⁵ ............................................. F16B 33/00
[52] U.S. Cl. ..................................... 411/368; 411/371; 411/531
[58] Field of Search ............... 411/368, 369, 371, 533, 411/542, 531, 544, 396, 184, 185, 186, 189, 373, 545, 154, 155, 156, 963, 161, 424, 188, 187, 511; 52/410; 1/512

[56] References Cited

U.S. PATENT DOCUMENTS

| 74,489 | 2/1868 | Bidwell | 411/386 |
|---|---|---|---|
| 3,357,064 | 12/1967 | Munse | 411/970 X |
| 3,782,437 | 1/1974 | Seckerson | 411/107 |
| 4,642,012 | 2/1987 | Blucher et al. | 411/371 |
| 4,763,456 | 8/1988 | Giánuzzi | 411/511 X |
| 4,856,951 | 8/1989 | Blucher et al. | 411/178 |
| 4,881,861 | 11/1989 | Hewison | 411/383 |
| 4,892,429 | 1/1990 | Giánnuzzi | 411/383 |

FOREIGN PATENT DOCUMENTS 3908367 7/1990 Fed. Rep. of Germany ...... 411/511

Primary Examiner—Rodney M. Lindsey
Attorney, Agent, or Firm—Neal C. Johnson; Thomas W. Buckman; John O'Brien

[57] ABSTRACT

A composite fastener comprised of a roofing screw and a roofing washer. The screw shank has a leading portion, which is threaded, and a locking portion. The locking portion has a substantially frusto-conical part adjoining the leading portion and an additional part adjoining the screw head. The substantially frusto-conical part defines a major diameter where it adjoins the additional part and a minor diameter where it adjoins the leading portion. Two locking tabs extend from the substantially frusto-conical part, in diametric opposition to each other, in such manner that an imaginary cylinder coaxial with the shank and with a diameter equal to the major diameter divides each tab into a proximal part inside the cylinder and a distal part outside the cylinder. The washer has an aperture with a margin that flexes the tabs to allow the tabs to pass through the aperture.

12 Claims, 4 Drawing Sheets

ROOFING FASTENER AND IMPROVED SCREW THEREFOR

CROSS-REFERENCE TO RELATED APPLICATION

This application is a continuation-in-part of U.S. patent application Ser. No. 07/604,459 filed Oct. 29, 1990, and assigned commonly herewith, for ROOFING FASTENER, IMPROVED SCREW THEREFOR, AND IMPROVED WASHER THEREFOR, the disclosure of which is incorporated herein by reference.

BACKGROUND OF THE INVENTION

Soft, poured substrates of gypsum-based materials, which may be over gypsum boards or other boards, or of wood fiber-filled, inorganic, hydraulic cement are used widely in roofing installations. Materials for such substrates of gypsum-based materials, over gypsum boards or other boards, are available commercially from various sources. Materials for such substrates of wood fiber-filled, inorganic, hydraulic cement are available commercially from Tectum, Inc., of Newark, Ohio, under its TECTUM TM trademark.

In fastening blankets of roofing insulation, such as rigid slabs of fibrous insulation or of foamed insulation, to such substrates, possibly with other roofing materials therebetween, fastening assemblies of a type disclosed in Blucher et al. U.S. Pat. No. 4,642,012 and 4,856,951 are used widely. Such fastening assemblies are available commercially from ITW Buildex (a division of Illinois Tool Works Inc.) of Itasca, Ill., under its GYPTEC TM trademark.

Typically, as disclosed in each of the aforesaid patents, such a fastening assembly utilizes four separate pieces, namely an elongate screw having threads at one end of its shank and having a head, an anchoring element attached to the threaded end of the screw shank, a washer between the screw head and the anchoring element, and a plate. The plate may be also called a roofing washer. The threaded end of the shank of the screw is threaded into an axial bore of the anchoring element. The anchoring element has external threads designed to be highly resistant to pull-out in a soft substrate. The plate is disposed between the washer and a rigid slab of roofing insulation when the screw is driven so as to drive the anchoring element.

Giannuzzi U.S. Pat. Nos. 4,763,456 and 4,892,429 contain similar disclosures of a fastening assembly employing a screw having a generally uniform crest diameter and a progressively tapered root diameter, along with a roofing washer. Bidwell U.S. Pat. No. 74,489 discloses a similar screw having a generally uniform crest diameter and a progressively tapered root diameter.

The aforenoted application (Ser. No. 07/604,459 filed Oct. 29, 1990) discloses a composite fastener in an improved form. As disclosed therein, the composite fastener comprises a roofing screw in an improved form and a roofing washer in an improved form. The roofing screw disclosed therein has two locking tabs, which are used to lock such screw to the roofing washer disclosed therein. Each locking tab has a distal edge, which is bevelled in such manner that one end of the distal edge is closer to the screw tip, as compared to the other end of the distal edge, and that the closer end leads the other end when the screw is driven. The locking tabs flex as the screw is driven through the washer.

This invention provides further improvements in the composite fastener disclosed in the aforenoted application and in the roofing screw disclosed therein.

SUMMARY OF THE INVENTION

This invention provides a roofing screw made from a resilient material with a head, a shank, and a tip. The screw has at least one locking tab, preferably two locking tabs, in diametric opposition to each other. According to this invention, a substantially frusto-conical part of the screw tends to center the screw, when the screw is being driven through an aperture of a roofing washer, so as to protect the locking tab or locking tabs against being broken accidentally by being pressed against the roofing washer at a margin of the aperture.

The shank, which extends between the head and the tip, defines an axis. A leading portion of the shank is joined to the tip and is threaded so as to define a maximum crest diameter. A locking portion of the shank is joined to the leading portion and has a transitional part, which is joined to the leading portion, and an additional part, which is joined to the transitional part and to the head. The transitional part has at least one locking tab, preferably two locking tabs, in diametric opposition to each other.

According to this invention, the transitional part is substantially frusto-conical and defines a major diameter at the additional part and a minor diameter. Moreover, in a normal position, the locking tab extends axially toward the head and outwardly in a radial sense, beyond the maximum crest diameter and beyond the major diameter. Furthermore, in the normal position, the locking tab extends in such manner that a first imaginary cylinder coaxial with the shank and with a diameter equal to the major diameter divides the locking tab into a proximal part inside the first imaginary cylinder and a distal part outside the first imaginary cylinder. The locking tab is capable of flexing into a flexed position wherein the locking tab fits within a second imaginary cylinder, which is coaxial with the shank, and which has a diameter equal approximately to the maximum crest diameter.

Advantageously, the substantially frusto-conical, transitional portion tends to center the roofing screw relative to the roofing washer so as to protect the locking tab against being broken accidentally by being driven against such washer at the margin of the aperture.

Preferably, the transitional part has two such tabs, in diametric opposition to each other. Each locking tab has a distal edge, which is bevelled in such manner that one end of the distal edge is closer to the screw tip, as compared to the other end of the distal edge, and that the closer end leads the other end when the screw is driven. Preferably, whether or not there are two such tabs, the major diameter is at least as large as the maximum crest diameter.

A roofing screw according to this invention may be advantageously combined with a roofing washer to provide a composite fastener according to this invention. The composite fastener is useful to fasten roofing materials to a substrate. The roofing washer has an aperture, which has a margin configured so as to define means coacting with the roofing screw, when such screw is driven through such washer, by allowing the leading portion to pass through the washer, by flexing the locking tab from the normal position into the flexed position, such that the locking tab can pass through the aperture, when such screw is driven sufficiently for the locking portion to extend through the aperture, and by allowing the locking tab to flex back toward the normal position when such screw is driven sufficiently for the head to be nearly contiguous with or to bear against such washer.

As mentioned above the substantially frusto-conical, transitional portion tends to center the roofing screw relative to the roofing washer so as to protect the locking tab against being broken accidentally by being driven against such washer at the margin of the aperture. Additionally, the roofing screw becomes locked to the roofing washer, by the locking tab, when the roofing screw is driven sufficiently for the head to be nearly contiguous with or to bear against the roofing washer.

These and other objects, features, and advantages of this invention are evident from the following description of a preferred embodiment of this invention with reference to the accompanying drawings.

DETAILED DESCRIPTION OF PREFERRED EMBODIMENT

Figure 2:
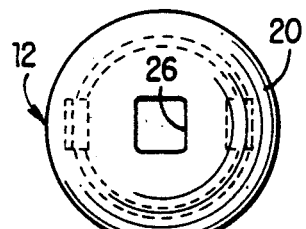
FIG. 2 is an end view of the roofing screw, as rotated by one quarter-turn about its axis. The roofing washer is omitted.

Although a preferred embodiment of this invention is illustrated in the drawings and is to be hereinafter described, it is to be here understood that the illustrated embodiment is exemplary and that this invention is not limited to such an embodiment.

As shown in FIGS. 1 through 7, a composite fastener 10 constituting a preferred embodiment of this invention is comprised of two pieces, namely a roofing screw 12 having features characteristic of this invention and a roofing washer 14. The composite fastener 10 is shown, in FIG. 3, as used to fasten a blanket 16 of roofing insulation to a substrate 18 with possibly other roofing materials (not shown) between the blanket 16 and the substrate 18.

The blanket 16 of roofing insulation may be a rigid slab, as shown, of fibrous insulation or of foamed insulation. The substrate 18 may be a soft substrate, as shown, such as a poured substrate of gypsum-based material, which may be over gypsum board (not shown) or other board, or of wood fiber-filled, inorganic, hydraulic cement.

The screw 12 has a head 20, a shank 22, and a tip 24. The head 20 is formed with a socket 26, which is generally square in cross-section, and which is adapted to coact with a driving tool (not shown) of a known type, such as a screw gun. The tip 24 is pointed, as shown, so as to cut through the blanket 16 of roofing insulation and into the substrate 18 when the screw 12 is driven.

The shank 22 has a leading or threaded portion 30 adjacent to the tip 24, a locking portion 32 adjacent to the head 20, and an unthreaded portion 34 between the threaded portion 30 and the locking portion 32.

The threaded portion 30 is threaded with a right-hand thread having sharp crests and flat roots, as shown, so as to define a maximum crest diameter (DC) which is a uniform crest diameter along substantially all of its axial length, except near the tip 24, and so as to define a root diameter decreasing progressively toward the tip 24 from a maximum root diameter where the threaded portion 30 merges with the unthreaded portion. The unthreaded portion 34 has a uniform diameter equal approximately to the maximum root diameter of the threaded portion 30.

Figure 3:
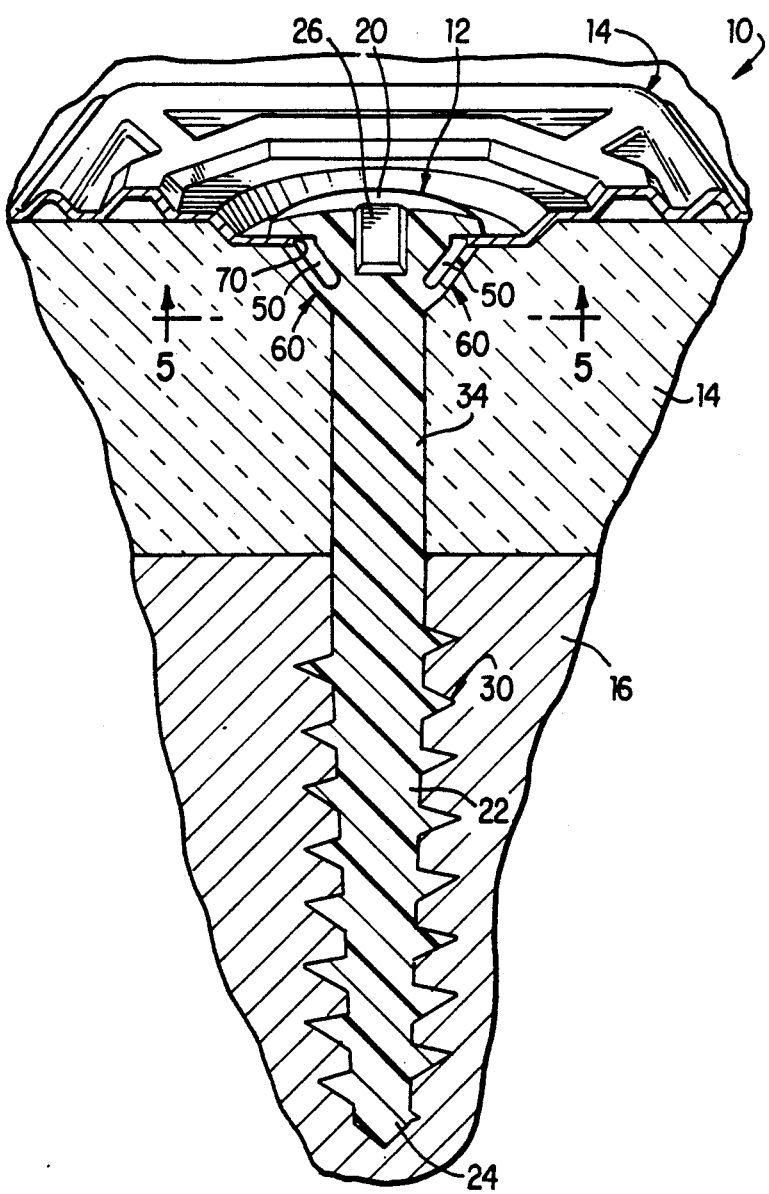
FIG. 3 is a perspective view taken in axial section through the roofing screw and the roofing washer, as used to fasten a blanket of roofing insulation to a substrate, in accordance with a preferred embodiment.
Figure 4:
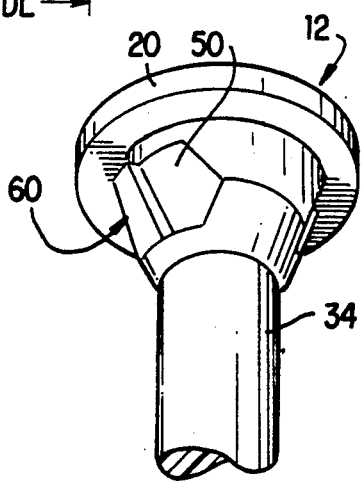
FIG. 4 is a fragmentary, perspective view of the roofing screw, as seen from its underside.
Figure 5:
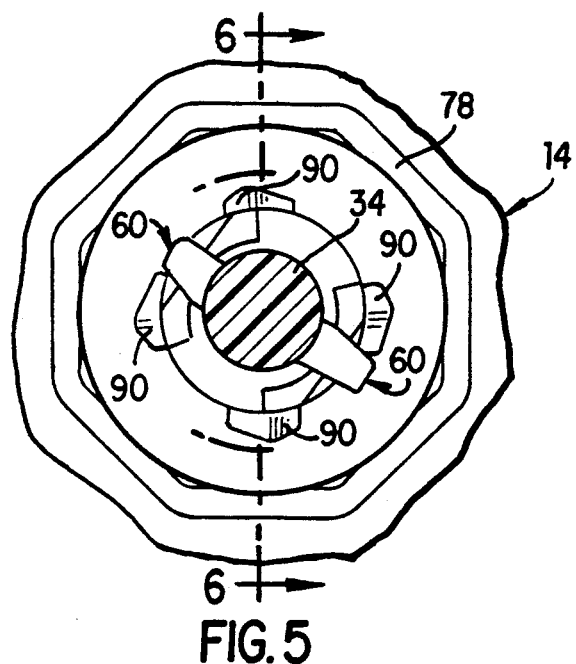
FIG. 5, on a smaller scale, is a fragmentary, sectional view taken along line 5—5 of FIG. 3, in a direction indicated by arrows.

Optimally, as shown in FIG. 3, the axial lengths of the respective threaded, unthreaded, and locking portions of the shank 22 are such that the threaded portion 30 becomes embedded fully in the substrate 18 when the composite fastener 1 is used to fasten the blanket 16 of roofing insulation to the substrate 18.

The locking portion 32 has a transitional part 40, which is joined directly to the unthreaded portion 34, and an additional part 42, which is joined directly to the transitional part 40 and to the head 20. The transitional part 40 is substantially frusto-conical, as shown, and defines a major diameter (DL) at the additional part 42 and a minor diameter (DM) at the unthreaded portion 34. The major diameter is at least as large as the maximum crest diameter. Preferably, as shown, the major diameter is equal approximately to the maximum crest diameter. The additional part 42 is substantially cylindrical, as shown, with a diameter coinciding with the major diameter. The unthreaded portion 34 is substantially cylindrical, as shown, with a diameter equal to the minor diameter.

Figure 8:
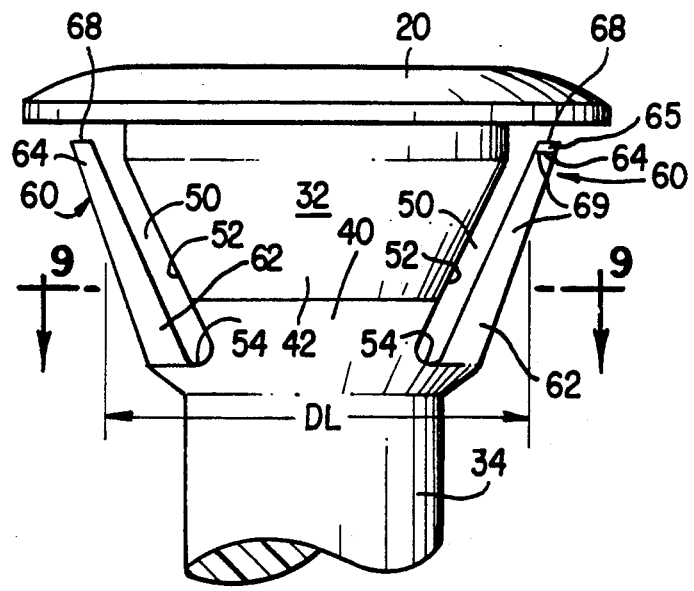
FIG. 8, on a larger scale, is a fragmentary, elevational view of certain portions of the roofing screw shown in FIGS. 1, 2, etc.
Figure 9:
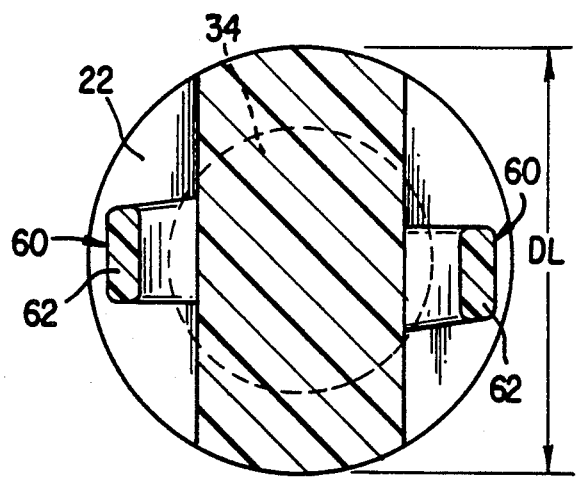
FIG. 9 is a sectional view taken along line 9—9 of FIG. 8, in a direction indicated by arrows.

As shown in FIG. 8 and elsewhere in the drawings, the locking portion 32 has two diametrically opposed recesses 50. Each recess 50 defines a planar surface 52, which is oriented at an oblique angle relative to the axis defined by the shank 22, and a base surface 54, which is oriented substantially at a right angle relative to the same axis. Moreover, the locking portion 32 has two locking tabs 60, each of which extends from a respective one of the recesses 50.

Each locking tab 60 extends from the base surface 54 of a respective one of the recesses 50, at an oblique angle relative to the axis defined by the shank 22, axially toward the head 20 and outwardly in a radial sense. In a normal position, each locking tab 60 extends beyond the maximum crest diameter and beyond the major diameter, in such manner that an imaginary cylinder being coaxial with the shank 22 and having a diameter equal approximately to the major diameter intersects such locking tab 60 so as to divide such locking tab 60 into a proximal part 62 and a distal part 64. Each locking tab 60 is capable of flexing into a flexed position wherein the locking tab 60 fits within an imaginary cylinder being coaxial with the shank 22 and having a diameter equally approximately to the maximum crest diameter.

The distal part 64 of each locking tab 60 is shaped as disclosed in the aforenoted application (Ser. No. 07/604,459 filed Oct. 29, 1990) so as to have a distal edge 65, which is bevelled in such manner that one end 66 of the distal edge 65 is closer to the tip 24, as compared to the other end 68 of the distal edge 65, and that the closer end 66 leads the other end 68 when the screw 12 is driven. Thus, installation torque is decreased, as compared to installation torque for a squared edge (not shown) on each locking tab.

Figure 1:
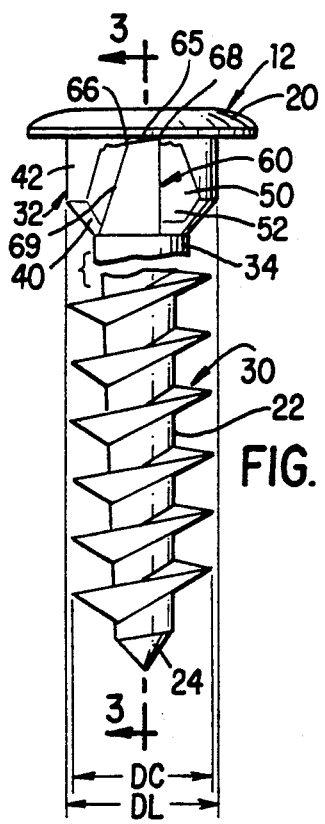
FIG. 1 is a shortened, elevational view of a roofing screw according to this invention. A roofing washer used therewith is shown fragmentarily.
Figure 6:
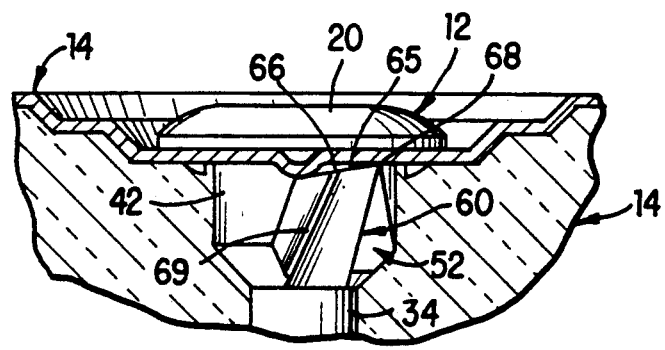
FIG. 6, on a slightly larger scale, is a sectional view taken along line 6—6 of FIG. 5, in a direction indicated by arrows.
Figure 7:
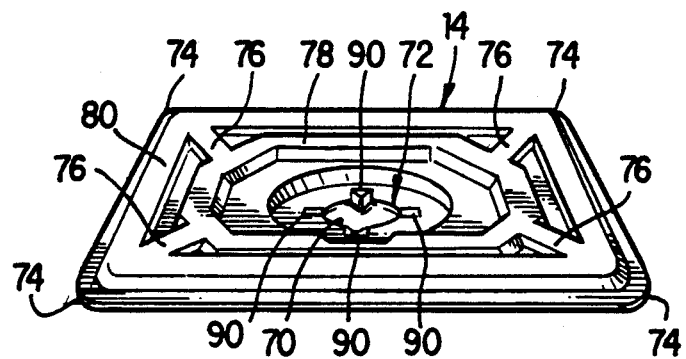
FIG. 7 is a smaller, perspective view of the roofing washer shown in FIGS. 1, 3, 5, and 6.

Each locking tab 60 has a leading edge 69 extending at an acute angle (e.g. about 30°) relative to a straight line along an imaginary, right circular cone coaxial with the shank 22, as shown in FIGS. 1 and 6, in such manner that the proximal part 62 of each locking tab 60 leads the distal part 64 of such locking tab 60 when the roofing screw 12 having a right-hand thread, as noted above, is driven into a substrate.

The roofing washer 14, which is similar to known roofing washers except for its rotation-limiting features, is stamped from a sheet of galvanized steel so as to have a circular, central aperture 70, in a countersunk socket 72, so as to be substantially square with rounded corners 74, and so as to have reinforcing ribs including diagonal reinforcing ribs 76, a reinforcing rib 78 surrounding the countersunk socket 72, and a peripheral reinforcing rib 80. The circular, central aperture 70 has a cylindrical margin, which has a diameter larger than the diameter (DL) of the roofing screw 12 where the locking portion 32 meets the head 20 and smaller than the diameter of the head 20.

The roofing washer 14 is similar in other respects to the roofing washer disclosed in the aforenoted application (Ser. No. 07/604,459 filed Oct. 29, 1990) and has four rotation-limiting nubs 90. Such nubs 90 coact with the locking tabs 60, in a manner disclosed in the aforenoted application, so as to limit relative rotation of the roofing screw 12 and the roofing washer 14.

In the normal position of each locking tab 60, such locking tab 60 remains spaced from the head 20 by a distance that slightly exceeds the thickness of the roofing washer 14 at the cylindrical margin of the circular, central aperture 70. Moreover, when the locking tabs 60 are in their normal positions, their distal edges 64 span a diametrical distance larger than the diameter of the cylindrical margin of the circular, central aperture 70 of the roofing washer 14. The bevelled, distal edges 64 of the locking tabs 60 coact with the rotation-limiting nubs 90 of the washer 14 so as to lock the screw 12 effectively to the washer 14.

Thus, when the roofing screw 12 is driven through the roofing washer 14, through the blanket 16 of roofing insulation, and into the substrate 18, the roofing screw 12 becomes locked to the roofing washer 14 by the locking tabs 60. The locking tabs 60 flex sufficiently to allow the locking tabs 60 to pass through the circular, central aperture 70, whereupon the locking tabs 60 flex back toward their normal positions so as to prevent the roofing screw 12 from withdrawing accidentally from such aperture 70. After the locking tabs 60 have flexed back toward their normal positions, their distal ends 64 may bear against the underside of the roofing washer 14, as shown in FIG. 3. Moreover, the nubs 90 coact with the locking tabs 60 to limit relative rotation of the roofing screw 12 and the roofing washer 14. Each locking tab 60 fits between two nubs 90.

The composite fastener 10 has many features of the composite fastener disclosed in the aforenoted application (Ser. No. 07/604,459 filed Oct. 29, 1990) but is improved in that the substantially frusto-conical, transitional part 40 of the locking portion 32 of the roofing screw 12 tends to center the roofing screw 12 relative to the central aperture 70 of the roofing washer 14 when the roofing screw 12 is driven through the roofing washer 14. Advantageously, therefore, the transitional part 40 protects each locking tab 60 against being broken accidentally by being driven against the roofing washer 14 at the cylindrical margin of such aperture 70.

Figure 10:
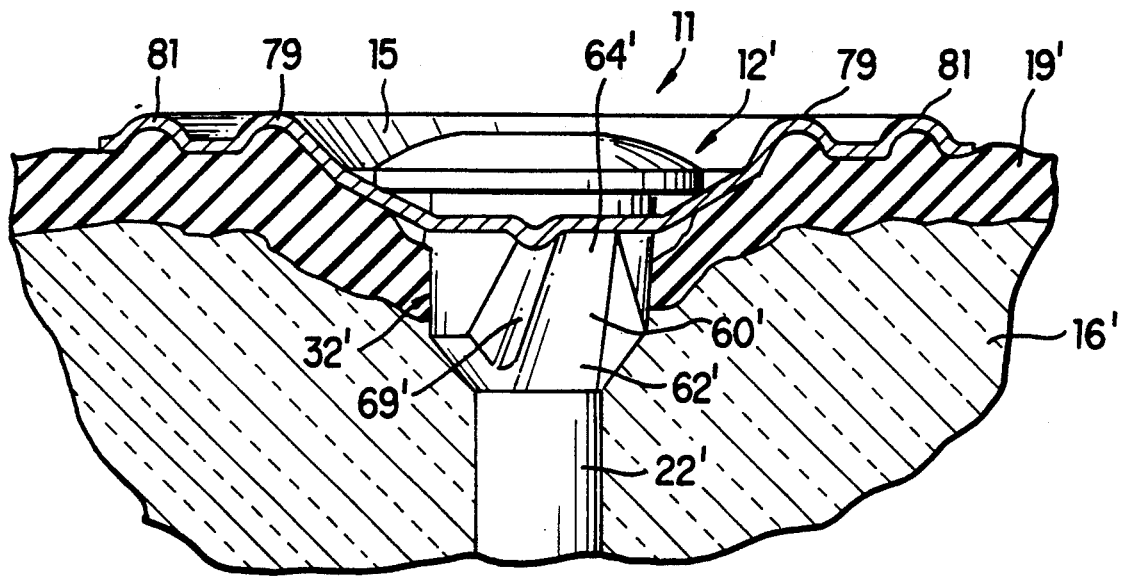
FIG. 10, on a larger scale, is a view analogous to FIG. 6 but taken to show an alternative embodiment, in which a roofing washer having a circular shape is used over a roofing membrane.
Figure 11:
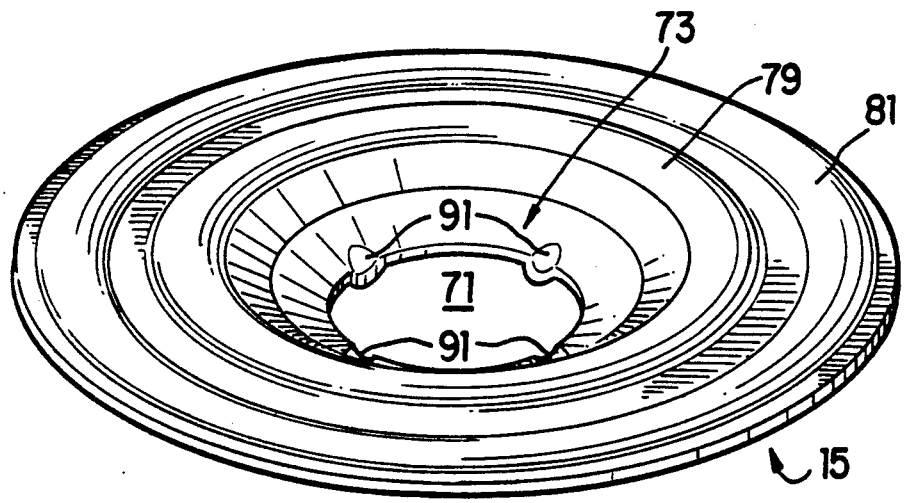
FIG. 11 is a perspective view of the roofing washer of FIG. 10.

In an additional embodiment, which is shown in FIG. 10, a composite fastener 11 is used to fasten a blanket 16' of roofing insulation to a substrate (not shown) with a roofing membrane 19 overlying the blanket 16', and with possibly other roofing materials (not shown) between the blanket 16' and the substrate. In FIGS. 10 and 11, primed reference numbers designate elements similar to elements designated by similar, unprimed reference numbers in FIGS. 1 through 9.

The composite fastener 11 is comprised of two pieces, namely a roofing screw 12' similar to the roofing screw 12 and a roofing washer 15 differing in some respects from the roofing washer 14. The blanket 16' of roofing insulation is similar to the blanket 16 of roofing insulation. The substrate, to which the composite fastener 11 fastens the blanket 16' is similar to the substrate 18. The roofing membrane 19 is a thin, flexible, waterproof sheet of rubber or rubber-like material, as known heretofore. Such a membrane has tends to pucker and to twist, where rubbed thereby, when penetrated by a roofing screw.

Being similar to the roofing screw 12, the roofing screw 12' has two locking tabs 60' (one shown) in diametric opposition to each other, on a locking portion 32' of the roofing screw 12'. Each locking tab 60' has a leading edge 69' extending an an acute angle (e g. about 30°) relative to a straight line along an imaginary, right circular cone coaxial with the shank 22' of the roofing screw 12', as shown in FIG. 10, in such manner that the proximal part 62' of each locking tab 60' leads the distal part 64' of such locking tab 60' when the roofing screw 12' having a right-hand thread (not shown) is driven into a substrate.

The roofing washer 15, which is similar to known roofing washers except for its rotation-limiting features, is stamped from a sheet of galvanized steel so as to have a circular, central aperture 71, in a countersunk socket 73, so as to be substantially circular, and so as to have a reinforcing rib 79 surrounding the countersunk socket 73 and a peripheral reinforcing rib 81. The roofing washer 14' has four rotation-limiting nubs 91, which coact with the locking tabs 60', in a manner disclosed in the aforesaid application (Ser. No. 07/604,459 filed Oct. 29, 1990) so as to limit relative rotation of the roofing screw 12' and the roofing washer 15.

Being inclined at an acute angle, as described above, the leading edge 69' of each locking tab 60' minimizes tendencies of the roofing membrane 19 to pucker or to twist, at such locking tab 60', when the roofing screw 12' penetrates the roofing membrane 19.

Various other modifications may be made in the preferred embodiment described above without departing from the scope and spirit of this invention.

We claim:

1. A roofing screw having a head, a shank, and a tip and being made from a resilient material, the shank extending between the head and the tip and defining an axis, the shank having a leading portion joined to the tip and a locking portion joined to the leading portion, the locking portion having a transitional part and an additional part between the transitional part and the head, the leading portion being threaded so as to define a maximum crest diameter, the transitional part being substantially frusto-conical and defining a major diameter at the additional part and a minor diameter, the transitional part having at least one locking tab, which in a normal position extends axially toward the head and outwardly in a radial sense, beyond the maximum crest diameter and beyond the major diameter, in such manner that an imaginary cylinder being coaxial with the shank and having a diameter equal to the major diameter intersects the locking tab so as to divide the locking tab into a proximal part and a distal part, the locking tab being capable of flexing into a flexed position wherein the locking tab fits within an imaginary cylinder being coaxial with the shank and having a diameter equal approximately to the maximum crest diameter, whereby the substantially frusto-conical, transitional part tends to center the roofing screw relative to an aperture of a roofing washer so as to protect the locking tab against being broken accidentally by being driven against the roofing washer at a margin of the aperture.

2. The roofing screw of claim 1 wherein the transitional part has two such tabs, in diametric opposition to each other.

3. The roofing screw of claim 2 wherein each locking tab has a distal edge with two opposite ends and is bevelled in such manner that one said end is closer to the tip, as compared to the other end, and that the closer end leads the other end when the screw is driven.

4. The roofing screw of claim 1 wherein each locking tab has a leading edge, which extends at an acute angle relative to a straight line along an imaginary, right circular cone coaxial with the shank.

5. The roofing screw of claim 3 wherein each locking tab has a leading edge, which extends at an acute angle relative to a straight line along an imaginary, right circular cone coaxial with the shank.

6. The roofing screw of claim 1 wherein the major diameter is at least as large as the maximum crest diameter.

7. A composite fastener useful to fasten roofing materials to a substrate, the composite fastener comprising (a) a roofing screw having a head, a shank, and a tip and being made from a resilient material, the shank extending between the head and the tip and defining an axis, the shank having a leading portion joined to the tip and a locking portion joined to the leading portion, the locking portion having a transitional part and an additional part between the transitional part and the head, the leading portion being threaded so as to define a maximum crest diameter, the transitional part being substantially frusto-conical and defining a major diameter at the additional part and a minor diameter, the transitional part having at least one locking tab, which in a normal position extends axially toward the head and outwardly in a radial sense, beyond the maximum crest diameter and beyond the major diameter, in such manner that an imaginary cylinder being coaxial with the shank and having a diameter equal to the major diameter intersects the locking tab so as to divide the locking tab into a proximal part and a distal part, the locking tab being capable of flexing into a flexed position wherein the locking tab fits within an imaginary cylinder being coaxial with the shank and having a diameter equal approximately to the maximum crest diameter, and (b) a roofing washer having an aperture, which has a margin configured so as to define means coacting with the roofing screw, when the roofing screw is driven through the roofing washer, by allowing the leading portion to pass through the aperture, by flexing the locking tab from the normal position into the flexed position, such that the locking tab can pass through the aperture, when the roofing screw is driven sufficiently for the locking portion to extend through the aperture, and by allowing the locking tab to flex back toward the normal position when the roofing screw is driven sufficiently for the head to be nearly contiguous with or to bear against the roofing washer, whereby the substantially frusto-conical, transitional part tends to center the roofing screw relative to the aperture of the roofing washer so as to protect the locking tab against being broken accidentally by being driven against the roofing washer at the margin of the aperture, and whereby the roofing screw becomes locked to the roofing washer, by the locking tab, when the roofing screw is driven sufficiently for the head to be nearly contiguous with or to bear against the roofing washer.

8. The composite fastener of claim 7 wherein the transitional portion has two such tabs, in diametric opposition to each other.

9. The composite fastener of claim 8 wherein each locking tab has a distal edge with two opposite ends and is bevelled in such manner that one said end is closer to the tip, as compared to the other end, and that the closer end leads the other end when the screw is driven.

10. The roofing screw of claim 7 wherein each locking tab has a leading edge, which extends at an acute angle relative to a straight line along an imaginary, right circular cone coaxial with the shank.

11. The roofing screw of claim 9 wherein each locking tab has a leading edge, which extends at an acute angle relative to a straight line along an imaginary, right circular cone coaxial with the shank.

12. The composite fastener of claim 7 wherein the major diameter is at least as large as the maximum crest diameter.

* * * * *